US010498444B1

(12) United States Patent
Hsiang et al.

(10) Patent No.: US 10,498,444 B1
(45) Date of Patent: Dec. 3, 2019

(54) OPTICAL WIRELESS COMMUNICATION SYSTEM

(71) Applicant: ACER INCORPORATED, New Taipei (TW)

(72) Inventors: Jui-Chieh Hsiang, New Taipei (TW); Chih-Chiang Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/114,223

(22) Filed: Aug. 28, 2018

(30) Foreign Application Priority Data

May 28, 2018 (TW) .............................. 107118080 A

(51) Int. Cl.
*H04B 10/116* (2013.01)
*H04B 10/114* (2013.01)
*H04B 10/50* (2013.01)

(52) U.S. Cl.
CPC ....... *H04B 10/116* (2013.01); *H04B 10/1141* (2013.01); *H04B 10/502* (2013.01)

(58) Field of Classification Search
CPC .. H04B 10/116; H04B 10/1141; H04B 10/502
See application file for complete search history.

(56) References Cited

U.S. PATENT DOCUMENTS

| 6,683,590 B1 | 1/2004 | Pang | |
| 2013/0021352 A1* | 1/2013 | Wyatt | G09G 5/395 345/520 |
| 2014/0184629 A1* | 7/2014 | Wyatt | G09G 5/393 345/547 |
| 2015/0378495 A1* | 12/2015 | Losh | G06F 3/0416 345/174 |
| 2019/0089927 A1* | 3/2019 | Yadav | H04N 5/92 |

FOREIGN PATENT DOCUMENTS

| JP | 2011-61305 | 3/2011 |
| TW | 201539996 A | 10/2015 |

* cited by examiner

*Primary Examiner* — Dzung D Tran
(74) *Attorney, Agent, or Firm* — Winston Hsu

(57) ABSTRACT

An optical wireless communication system includes a display panel, a frame rate controller, a backlight module, and a timing controller. The display panel includes a glass substrate, and the frame rate controller is configured to modulate multiple frequencies. The timing controller is configured to drive different scan regions of the glass substrate using at least a first frequency and a second frequency among the multiple frequencies and/or drive different backlight regions of the backlight module using at least a third frequency and a fourth frequency among the multiple frequencies for transmitting optical data. The first frequency is different from the second frequency, the third frequency is different from the fourth frequency, the value of the second frequency is a multiple of the value of the first frequency, and the value of the fourth frequency is a multiple of the value of the third frequency.

4 Claims, 3 Drawing Sheets

US 10,498,444 B1

OPTICAL WIRELESS COMMUNICATION SYSTEM

CROSS REFERENCE TO RELATED APPLICATION

This application claims priority of Taiwan Application No. 107118080 filed on 2018 May 28.

BACKGROUND OF THE INVENTION

1. Field of the Invention

The present invention is related to an optical wireless communication system, and more particularly, to an optical wireless communication system with low power consumption, high data capacity and low image flicker.

2. Description of the Prior Art

Compared to traditional incandescent bulbs, light-emitting diodes (LEDs) are advantageous in low power consumption, long lifetime, small size, no warm-up time, fast reaction speed, and the ability to be manufactured as small or array devices. In addition to outdoor displays, traffic signs, and liquid crystal display (LCD) backlight for various electronic devices such as mobile phones, notebook computers or personal digital assistants (PDAs), LEDs are also widely used as indoor/outdoor lighting devices in place of fluorescent of incandescent lamps.

With the development in global communication, optical wireless communication technologies proliferate and become essential in deploying communication networks. An optical wireless communication system may take advantage of LEDs which can be pulsed at very high speeds without noticeable effect on the lighting output and human eyes, thereby transmitting optical date. In addition to high data capacity, a visible light optical wireless communication can provide more secure communications over a radio wave wireless system by using narrow and highly-directional beams for data transmission. Also, the operation of the visible light optical wireless communication does not pose hazards to human bodies or interfere with surrounding equipment, and can function as a secure wireless base station.

Existing optical wireless communication systems adopt an LED backlight signal modulation scheme in which a transmitting display is configured to transmit fast-pulsed digital signals (logic 1 and logic 0) by adjusting the refresh frequency of a backlight module, while a receiving device is configured to receive and identify the digital signals unperceivable to human eyes using an image sensor equipped with a specific application program. However, the above-mentioned backlight signal modulation scheme operates at high frequencies which may increase the power consumption of the backlight module and reduce image brightness. When required to operate in a low-brightness backlight mode, the backlight module may not be able to adjust the brightness of an image to a designated low value when implemented with the backlight signal modulation scheme. Therefore, there is a need for to an optical wireless communication system with low power consumption and high data capacity.

SUMMARY OF THE INVENTION

The present invention provides an optical wireless communication system which includes a display panel, a frame rate controller, a scan driver and a timing controller. The display panel includes a glass substrate. The frame rate controller is configured to modulate multiple frequencies. The timing controller is configured to instruct the scan driving circuit to drive a first scan region and a second scan region of the glass substrate using at least a first frequency and a second frequency among the multiple frequencies so as to transmit an optical data. The first frequency is different from the second frequency, and a value of the second frequency is a multiple of a value of the first frequency.

The present invention also provides an optical wireless communication system which includes a display panel, a backlight module, a frame rate controller, and a timing controller. The backlight module is configured to provide light for operating the display panel. The frame rate controller is configured to modulate multiple frequencies. The timing controller is configured to instruct the backlight module to drive a first backlight region of the backlight module using at least a first frequency among the multiple frequencies and drive a second backlight region of the backlight module using at least a second frequency. The first frequency is different from the second frequency, and a value of the second frequency is a multiple of a value of the first frequency.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
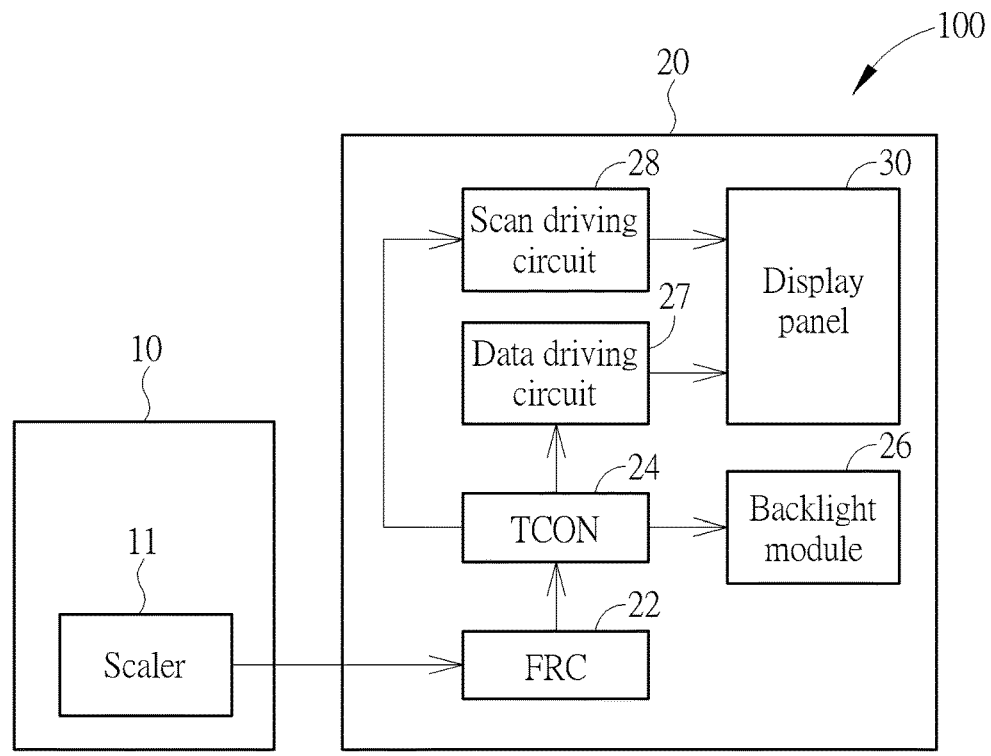
FIG. 1 is a functional diagram illustrating an optical wireless communication system according to an embodiment of the present invention.
Figure 2:
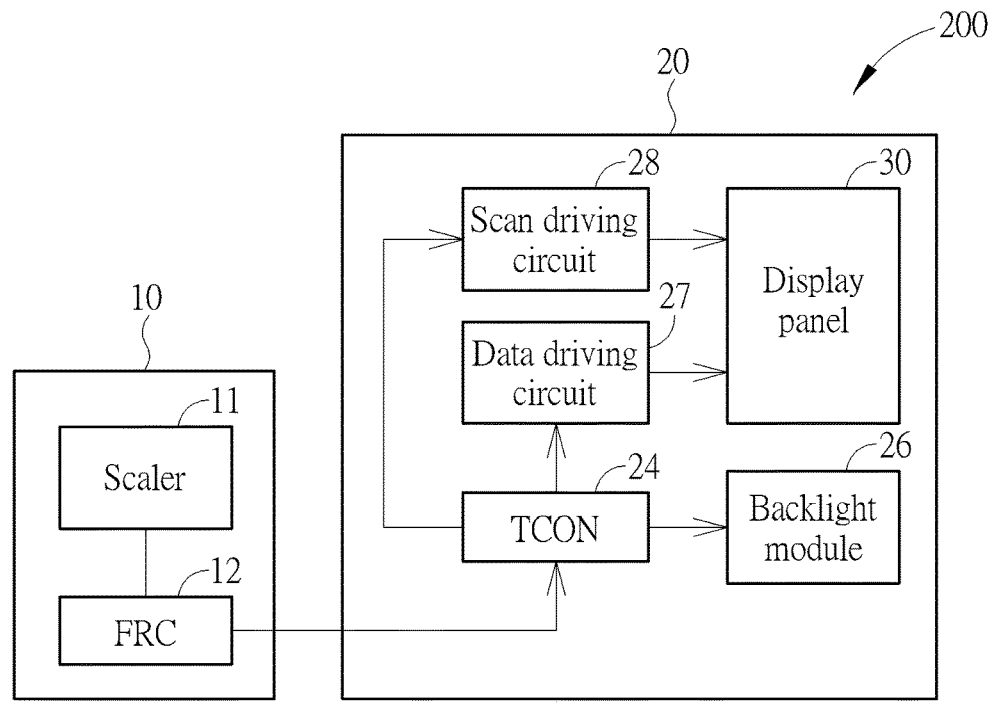
FIG. 2 is a functional diagram illustrating an optical wireless communication system according to another embodiment of the present invention.

FIG. 1 is a functional diagram illustrating an optical wireless communication system 100 according to an embodiment of the present invention. FIG. 2 is a functional diagram illustrating an optical wireless communication system 200 according to another embodiment of the present invention. Each of the optical wireless communication systems 100 and 200 includes a graphics processing unit (GPU) terminal 10 and a panel control panel 20. In the optical wireless communication system 100, the GPU terminal 10 includes a scaler 11, while the panel control panel 20 includes a frame rate controller (FRC) 22, a timing controller (TCON) 24, a backlight module 26, a data driving circuit 27, a scan driving circuit 28, and a display panel 30. In the optical wireless communication system 200, the GPU terminal 10 includes a scaler 11 and a frame rate controller 12, while the panel control panel 20 includes a timing controller 24, a backlight module 26, a data driving circuit 27, a scan driving circuit 28, and a display panel 30.

In an embodiment of the present invention, the backlight module 26 may include multiple LEDs in order to provide the light for operating the display panel 30. The display panel 30 may be a liquid crystal display (LCD) panel which includes a liquid crystal layer, glass substrates, polarizers, filters, and diffuser films. The liquid crystal layer is disposed between two glass substrates. Micro-structures of red, green, blue and black colors are fabricated on the surface of the upper glass substrate so as to form color filters. A plurality of transistors are fabricated on the surface of the lower glass substrate so as to form various driving circuits such as the data driving circuit 27 and the scan driving circuit 28. The current flowing through the transistors by applying different bias voltages results in a variation in electrical field. The rotation angle of the liquid crystal molecules may thus be adjusted for changing the polarity of light, thereby controlling the display of images. However, the structure of the display panel 30 does not limit the scope of the present invention.

In an embodiment of the present invention, a glass substrate signal frequency modulation scheme may be adopted when performing optical wireless communication. At least two different frequencies are modulated for two different signals. Different scan regions of the glass substrates in the display panel 30 are driven by at least two different frequencies for transmitting optical signals, wherein the value of each frequency among the different frequencies is a multiple of the value of another frequency among the different frequencies.

Figure 3:
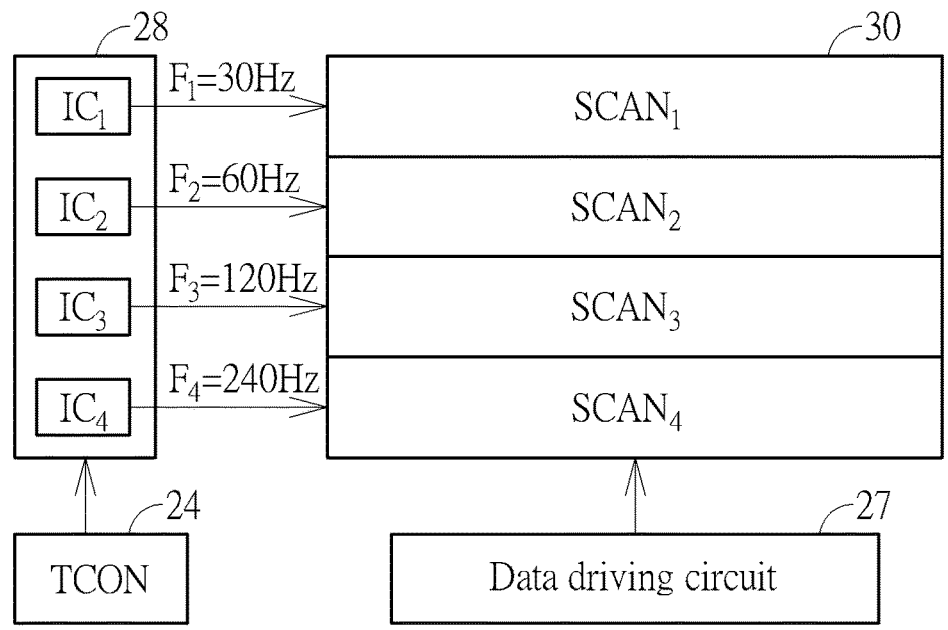
FIG. 3 is a diagram illustrating a method of performing optical wireless communication according to an embodiment of the present invention.

FIG. 3 is a diagram illustrating a method of performing optical wireless communication according to an embodiment of the present invention. When transmitting digital optical signals, the frame rate controller 12 or 22 is configured to modulate multiple frequencies so that the timing controller 24 may instruct M integrated circuits $IC_1$~$IC_M$ in the scan driving circuit 28 to drive M scan region $SCAN_1$~$SCAN_M$ of the glass substrates in the display panel 30 using frequencies $F_1$~$F_M$, respectively. The values of the frequencies $F_1$~$F_M$ have a relationship of $F_M=A_i*F_i$, wherein M is an integer larger than 1, i is an integer between 0 and M, $A_1$~$A_i$ are positive integers, and at least one of $A_1$~$A_i$ is larger than 1. FIG. 3 depicts an embodiment of M=4 in which the scan driving circuit 28 includes 4 integrated circuits $IC_1$~$IC_4$ corresponding to the scan region $SCAN_1$~$SCAN_4$ of the glass substrates in the display panel 30, respectively. The integrated circuit $IC_1$ is configured to drive the scan region $SCAN_1$ with an image refresh frequency $F_1=30$ Hz. The integrated circuit $IC_2$ is configured to drive the scan region $SCAN_2$ with an image refresh frequency $F_2=60$ Hz. The integrated circuit $IC_3$ is configured to drive the scan region $SCAN_3$ with an image refresh frequency $F_3=120$ Hz. The integrated circuit $IC_4$ is configured to drive the scan region $SCAN_4$ with an image refresh frequency $F_4=240$ Hz. In other words, $A_1=8$, $A_2=4$, and $A_3=2$.

In another embodiment of the present invention, a backlight module frequency modulation scheme may further be adopted when performing optical wireless communication. At least two different frequencies are modulated for two different signals. Different backlight regions of the backlight module 26 are driven by at least two different frequencies for transmitting optical signals, wherein the value of each frequency among the different frequencies is a multiple of the value of another frequency among the different frequencies.

Figure 4:
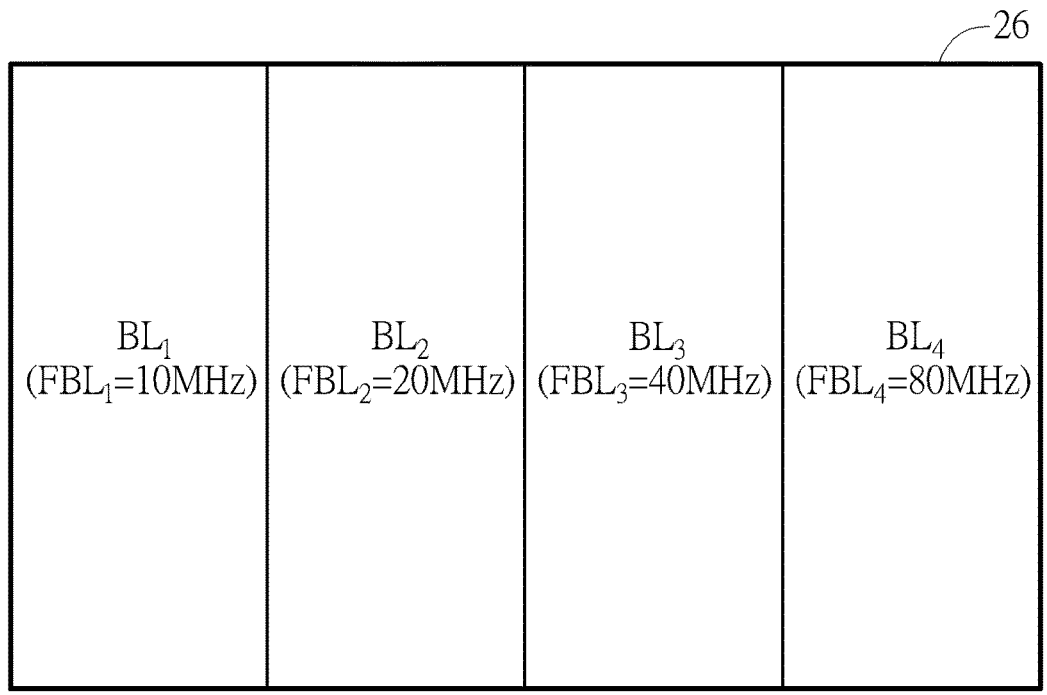
FIG. 4 is a diagram illustrating a method of performing optical wireless communication according to another embodiment of the present invention.
Figure 5:
FIG. 5 is a diagram illustrating a method of performing optical wireless communication according to another embodiment of the present invention.
Figure 6:
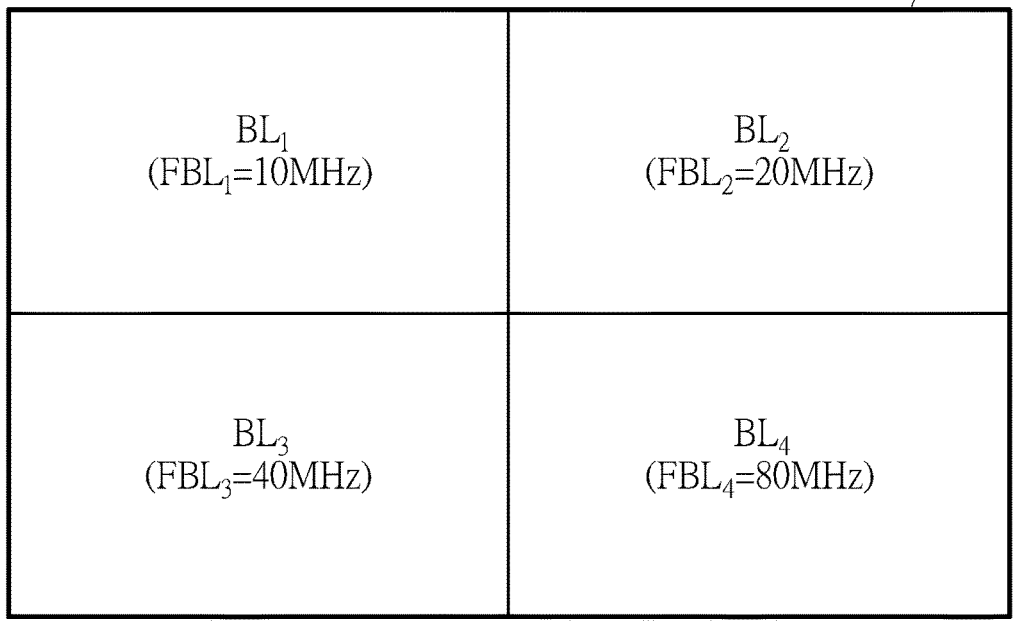
FIG. 6 is a diagram illustrating a method of performing optical wireless communication according to another embodiment of the present invention.

FIGS. 4-6 are diagrams illustrating methods of performing optical wireless communication according to embodiments of the present invention. The backlight module 26 includes N backlight regions $BL_1$~$BL_N$ with refresh frequencies $F_{BL1}$~$F_{BLN}$, respectively. The values of the frequencies $F_{BL1}$~$F_{BLN}$ have a relationship of $F_{BLN}=B_j*F_{BLj}$, wherein N is an integer larger than 1, j is an integer between 0 and N, $B_1$~$B_j$ are positive integers, and at least one of $B_1$~$B_j$ is larger than 1. FIGS. 4~6 depict the embodiments of N=4 in which the backlight module 26 includes 4 backlight regions $BL_1$~$BL_4$ with refresh frequencies $F_{BL1}$~$F_{BL4}$. The refresh frequencies $F_{BL1}$ of the backlight region $BL_1$ is 10 MHz. The refresh frequencies $F_{BL2}$ of the backlight region $BL_2$ is 20 MHz. The refresh frequencies $F_{BL3}$ of the backlight region $BL_3$ is 30 MHz. The refresh frequencies $F_{BL4}$ of the backlight region $BL_4$ is 80 MHz. In other words, $B_1=8$, $B_2=4$, and $B_3=2$.

In another embodiment of the present invention, the backlight regions $BL_1$~$BL_N$ may be vertically-striped regions (FIG. 4), horizontally-striped regions (FIG. 5) or equally-divided regions (FIG. 6) of the backlight module 26. However, the embodiments depicted in FIGS. 4-6 are merely for illustrative purposes and do not limit the scope of the present invention.

In another embodiment of the present invention, the glass substrate signal frequency modulation scheme depicted in FIG. 3 and the backlight module frequency modulation scheme depicted in FIGS. 4~6 may be combined to further increase data capacity when performing optical wireless communication.

In conclusion, the present invention provides an optical wireless communication system with low power consumption and high data capacity. At least one of the glass substrate signal frequency modulation scheme and the backlight module frequency modulation scheme is adopted so as to modulate at least two different frequencies for two different signals. Different scan regions of the glass substrates in the display panel or different backlight regions of the backlight module are driven by at least two different frequencies for transmitting optical signals, thereby increasing data capacity when performing optical wireless communication. Meanwhile, the value of each frequency among the different frequencies is a multiple of the value of another frequency among the different frequencies, thereby reducing image flicker and signal discontinuity. Also, the glass substrate signal frequency modulation scheme of the present invention does not require high-frequency operation of the backlight module or reduce the brightness of the backlight module, it does not increase the power consumption of the backlight module or influence the low-brightness operation of the backlight module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An optical wireless communication system, comprising:
   a display panel including a glass substrate;
   a backlight module configured to provide light for operating the display panel;

a frame rate controller configured to modulate multiple frequencies;
a scan driving circuit; and
a timing controller configured to:
  instruct the scan driving circuit to drive a first scan region and a second scan region of the glass substrate using at least a first frequency and a second frequency among the multiple frequencies so as to transmit an optical data; and
  instruct the backlight module to drive a first backlight region of the backlight module using a third frequency and drive a second backlight region of the backlight module using a fourth frequency, wherein the first frequency is different from the second frequency, the third frequency id different from the fourth frequency, a value of the second frequency is a multiple of a value of the first frequency, and a value of the fourth frequency is a multiple of a value of the third frequency.

2. The optical wireless communication system of claim 1, wherein the scan driving circuit comprises:
  a first integrated circuit configured to refresh images of the first scan region using the first frequency so as to transmit the optical data; and
  a second integrated circuit configured to refresh images of the second scan region using the second frequency so as to transmit the optical data.

3. The optical wireless communication system of claim 1, wherein the frame rate controller is disposed on a graphics processing unit terminal, and the timing controller, the scan driving circuit and the display panel are disposed on a panel control terminal.

4. The optical wireless communication system of claim 1, wherein the frame rate controller, the timing controller, the scan driving circuit and the display panel are disposed on a panel control terminal.

* * * * *